US 6,560,776 B1

(12) United States Patent
Breggin et al.

(10) Patent No.: US 6,560,776 B1
(45) Date of Patent: May 6, 2003

(54) SOFTWARE INSTALLATION VERIFICATION TOOL

(75) Inventors: David G. Breggin, Littleton, CO (US); Myron Eugene Drapal, Lafayette, CO (US); Deborah K. Prenger, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/507,125

(22) Filed: Feb. 18, 2000

(51) Int. Cl.[7] .............................................. G06F 9/445
(52) U.S. Cl. ....................... 717/176; 707/203
(58) Field of Search ........................... 717/11, 2, 4, 8, 717/168–178; 707/203; 703/22

(56) References Cited

U.S. PATENT DOCUMENTS

| | | | | |
|---|---|---|---|---|
| 4,558,413 A | * | 12/1985 | Schmidt et al. | 707/203 |
| 6,247,128 B1 | * | 6/2001 | Fisher et al. | 713/100 |
| 6,269,480 B1 | * | 7/2001 | Curtis | 717/11 |
| 6,314,565 B1 | * | 11/2001 | Kenner et al. | 717/178 |

* cited by examiner

*Primary Examiner*—Gregory Morse
*Assistant Examiner*—Chuck Kendall
(74) *Attorney, Agent, or Firm*—Sheridan Ross P.C.

(57) ABSTRACT

The method and system of the present invention automatically generates an installation file or database containing information describing or characterizing the installation. A verifying tool can compare the installation information to installed information relating to or describing the files actually installed by the install program.

47 Claims, 11 Drawing Sheets

FIG. 4

SOFTWARE INSTALLATION VERIFICATION TOOL

FIELD OF THE INVENTION

The present invention relates generally to architectures for software installation and specifically to architectures for diagnosing problems caused by software installation.

BACKGROUND OF THE INVENTION

Software on product installations are not only complex but can create a host of systemic problems, particularly for "WINDOWS" operating systems. These problems can cause the newly installed and/or previously installed software on a target computer to fail.

Reasons for such failures are many. Typically, there are a variety of system or shared files that the new software may utilize. During installation, a different version (i.e., a newer or older version) of such system and/or shared files may overwrite or replace one or more existing system and/or shared files. The newly installed files may be incompatible with existing files. Alternatively, a system and/or shared file that is not replaced during installation may be incompatible with the installed software. For example, it is not uncommon for a user to modify an existing file, particularly when the file is part of software originally distributed as source code (e.g., a web page).

The reasons for the failure are often difficult to diagnose. First, diagnosis typically requires a broad range of information about the target computer that is currently gathered by not one but a number of different tools. These tools are often difficult to use and/or do not interface with one another. Second, where several versions of a file exist on the system it may not be possible to determine which of these files is being utilized by the software. In "WINDOWS" applications, for example, a System Registry (which stores setup information for the hardware, software and operating system) is used to locate system or shared files. Only one version of a specific file can be registered, though multiple versions of that file may exist on the system. The version that is being used by an application may not be the one that is listed in the Registry. Third, the database required to perform the diagnosis can be large, cumbersome, and as a result laden with errors. Existing products for diagnosing software failures, such as "VERSION STAMPER" by Desaware and a program known as MMDebug.EXE in the Lucent "INTUITY" message manager of Lucent Technologies Inc., require a manually generated database of known files that is compared to the files on the target computer. In some applications, the number of files, registry entries, and other information to be compared and/or gathered during diagnosis can be large (e.g., thousands of items). Finally, an end user modification of a file used by the installed software can be extremely difficult to detect particularly when the person performing the diagnosis is unaware that the end user performed any modifications to the system.

SUMMARY OF THE INVENTION

The method and system of the present invention addresses these and other problems of the prior art. Briefly, the method and system automatically generates an installation file or database containing information describing or characterizing the installation. A verification tool can compare the installation information to installed information relating to or describing the files actually installed by the install program to locate or identify potential problems. As will be appreciated, an install program or software is a means or algorithm by which a program and its supporting files and other information can be placed onto a target computer in a predetermined fashion. Some user input is generally required to properly configure the software before or during installation.

In a first embodiment, a method for generating information for use in verifying an installation of software onto a target computer includes:

(a) parsing the script (e.g., a file containing commands to be executed) of install software to provide a list of items (e.g. files) regarding the install software; and (b) collecting information about each item in the list to form installation data. To verify the installation, the method can include additional steps such as executing the install software on a target computer and comparing the installation data with information on the target computer. In one configuration, the method includes the additional step of incorporating the installation data from the second step into the installation program such that the installation is installed in the executing step.

As will be appreciated, "parsing" refers to the analysis by a computer of the structure of statements in a human or artificial language. Parsing is typically done by comparing text to be parsed with a grammar which defines possible structures. The parsing can be done top-down (i.e., the computer starts by looking for a particular constituent) or bottom-up (i.e., the computer accepts elements from the text and tries to put them together).

The information in the installation data can include one or more of the following: file description, file location, file size, file version, last modification date of file, and whether or not the file is registered and where in the Registry the file is registered. The information can be combined with additional input that is customized for a specific application. Such additional information could include file grouping and override default error analysis/reporting performed by the comparing step. The information can be in a format that is not easily editable by an end-user to assist in the detection of end-user modifications of application files. This prevents the end-user from easily concealing such modifications.

This embodiment of the present invention has many advantages over the prior art including automated gathering of file and registry information, the use of installation script as a source for file and registry information, and/or viewing of remotely saved and/or transmitted data and of file contents, directories, system parameters, and arbitrary system registry entries.

The parsing step can include a number of substeps. For example, parsing can include the substep of setting a mode indicator for controlling a mode of the computer. The mode is typically a parsing mode and/or a nonparsing mode. The parsing step can further include the step of searching in the text of the script for a symbol (e.g., a compiler variable and/or a noncompiler variable) indicating a change in the mode of the computer. In this regard, the computer may determine a nesting level associated with a compiler variable and set the mode indicator based on the nesting level. The compiler variable can be included in a stack of compiler variables, with the stack providing the nesting level of the compiler variable.

In another configuration, the comparing step includes the step of collecting information on a file installed on the target computer during the executing step, with the information including item types contained in the installation data referred to above. The comparing step can further include the step of collecting predetermined information about the target computer. Predetermined information can include a directory of files that were replaced during installation, a directory of files added during the installation, hardware configuration information, and contents of specific text files.

In another configuration, the comparing step generates one or more exceptions (e.g., an event that cannot be handled by a normal process). These exceptions can be, for example, "file is missing," "file is different size," "file is different date," "file version is older," "file version is newer," "file is not registered," "file registered is not in the correct installation location," registry key is missing," "registry value name is missing," and "registry value data is incorrect." The exceptions can be filtered to exclude known exceptions from analysis. In this manner, only new exceptions are reported, and the comparing step can be used automatically and/or periodically for system monitoring.

The output of the comparing step can be saved in a format that is suitable for transmission via E-mail. Such saved/E-mailed files can be viewed remotely to display the original comparison data, including color coding to signify the anticipated severity of the exception(s).

In another embodiment of the present invention, a system for generating information for use in verifying an installation of software onto a target computer includes:

(a) means for parsing script of install software to provide a list of items regarding the install software; and (b) means for collecting information about each item in the list to form installation data.

In another embodiment, a system for generating information for use in verifying an installation of software includes:

(a) a computer;

(b) an install program in the memory of the computer;

(c) a script parser, in the computer memory, for parsing script of an install program to create an installation file. The installation file contains information about a target computer after execution of the install program on the target computer.

BRIEF DESCRIPTION OF THE DRAWINGS

FIG. 4 is a sample of a graphical display of the installation database;

DETAILED DESCRIPTION

Figure 1:
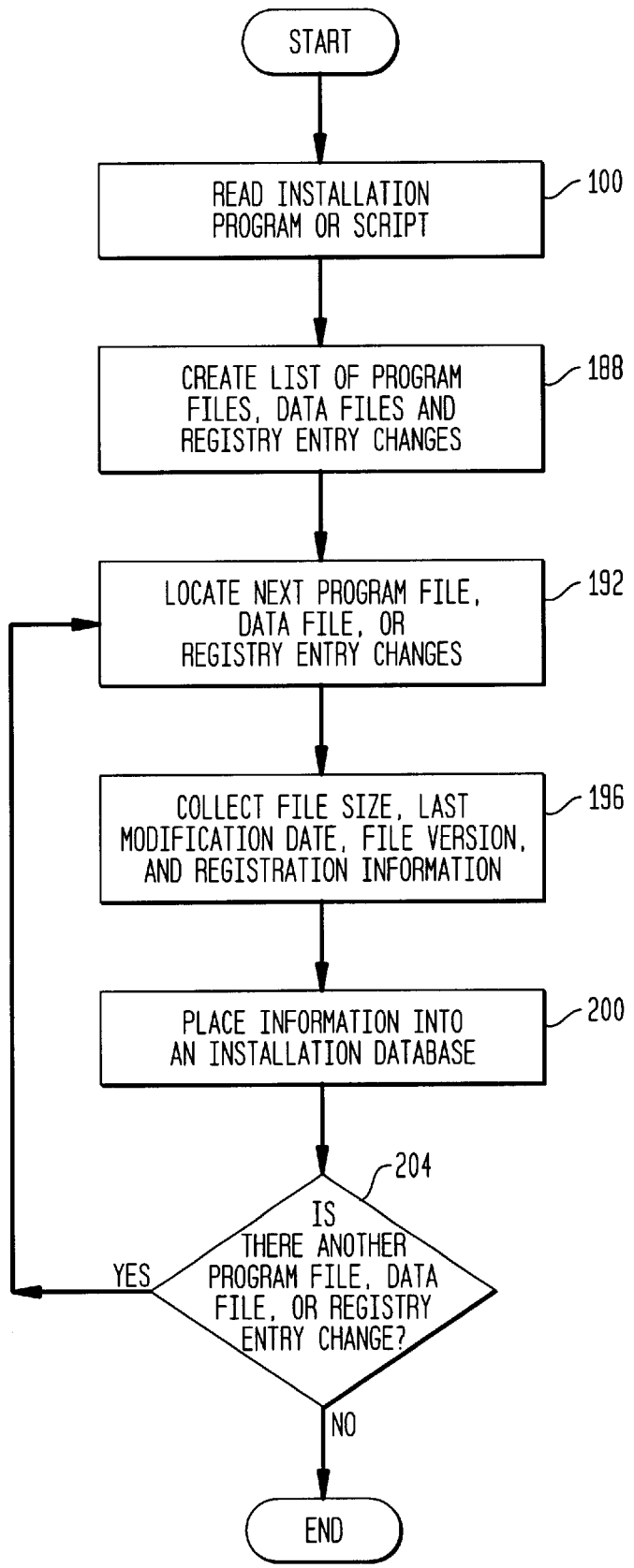
FIG. 1 is a flowchart showing a first embodiment of the present invention.
Figure 6:
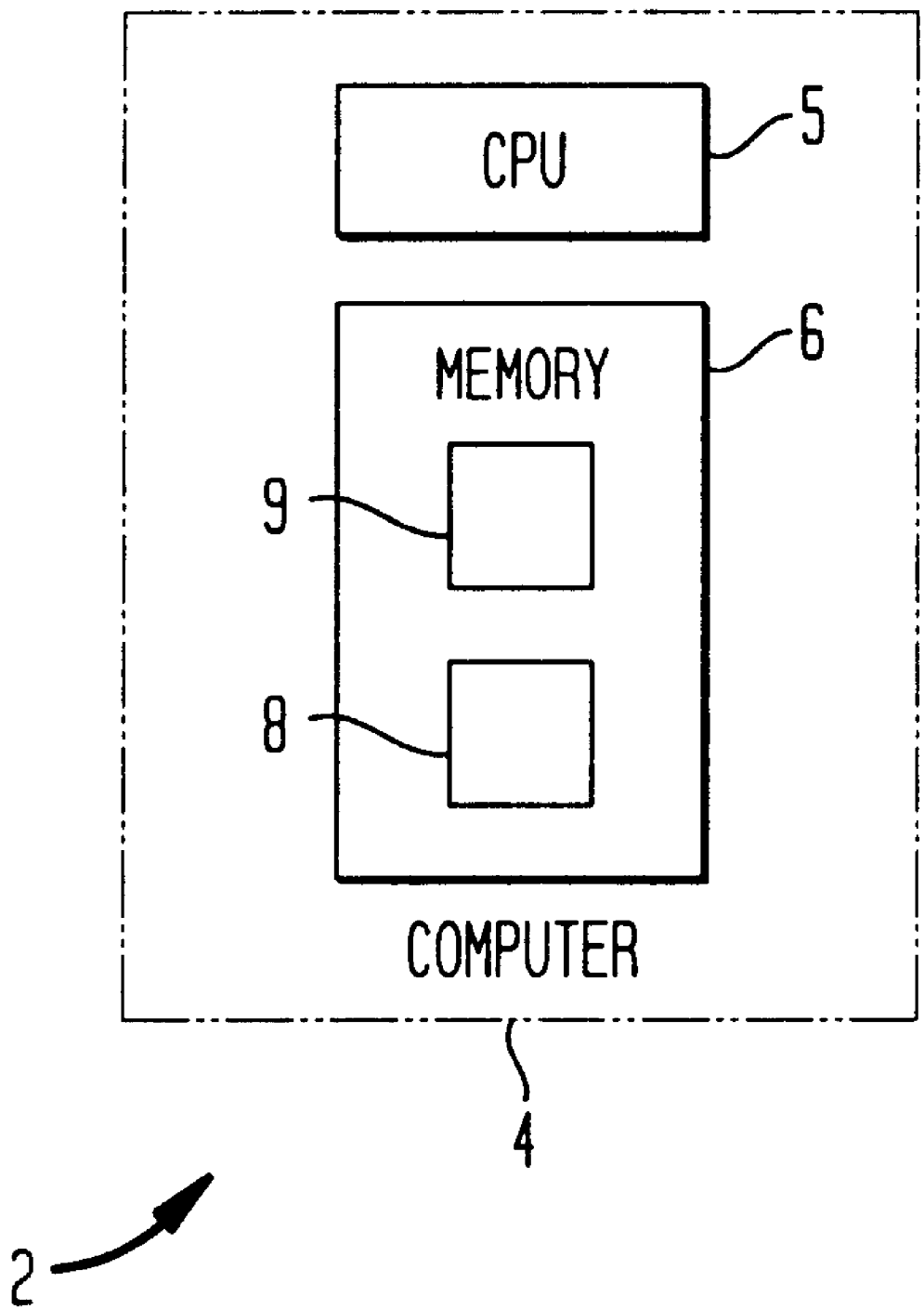
FIG. 6 is a block diagram showing the various components of a hardware architecture according to an embodiment of the present invention.

Referring to FIGS. 1 and 6, a first embodiment of the present invention is depicted. The embodiment is an installation analysis tool that creates a verification or installation database based on an analysis of the install program before the installation. The system 2 includes a build computer 4 having a central processing unit 5, a memory 6 that includes a script parser 8 and install software 9.

As will be appreciated, the install program is created by a builder or installer on a computer that is hereinafter referred to as the build computer. The builder or installer writes a program or script describing how the software and supporting files are to be installed on a target computer. This program or script is combined with a copy of all of the necessary software and/or files to form the installation program.

Although the implementation discussed below is for "WINDOWS"-based applications and is specifically designed for the "WISE" scripting language distributed by Great Lakes Business Systems, Inc. (Wise Solutions, Inc.), the present invention is equally applicable to other architectures using other operating systems (e.g., MacIntosh operating system) and/or other scripting languages (e.g., "INSTALL SHIELD" distributed by InstallShield Software Corporation).

Referring to FIG. 1, the (build) computer first reads in box 100 the installation program or script (and some additional input as set forth below) and creates a list of program files, data files, and/or registry entry changes (for "WINDOWS" applications) and writes certain of this information to the installation database.

Figure 2A:
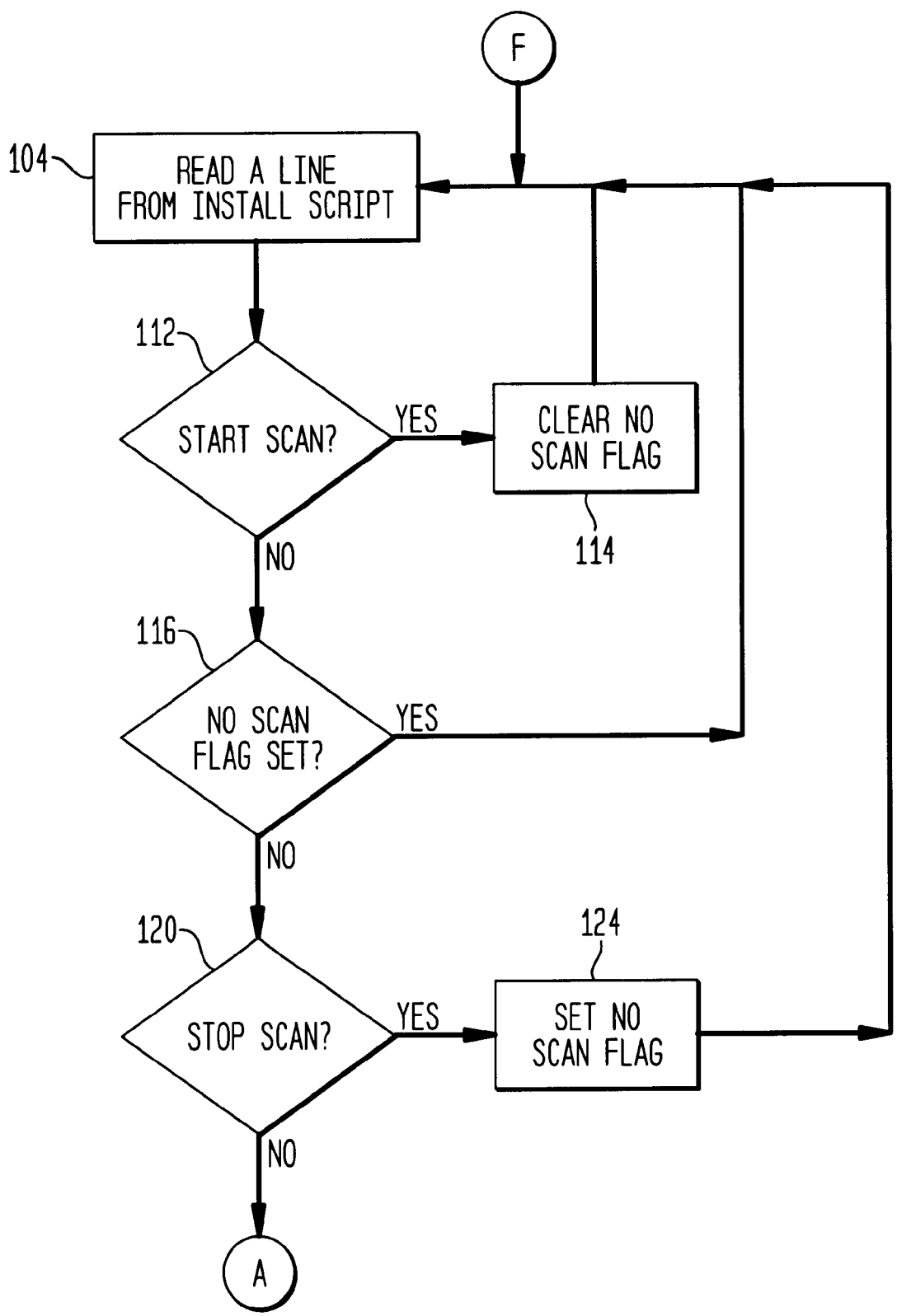
FIGS. 2A–E are flowcharts depicting the read operation of FIG. 1.

The iterative process used in the read step 100 is depicted in FIGS. 2A–E. In FIG. 2A, the computer in box 104 reads a first line of the installation script.

The processor proceeds to decision diamond 112 and determines if the scan or parse should be (re)started (if the processor is not already in a parsing mode). The processor does this by determining if there is a comment line in the line of script containing a "start" command. A "start" command causes the processor to resume scanning (i.e., parsing of script).

Comment lines can be used by the builder or installer in the installation script to selectively exclude script from the parsing or scanning operation. This is done, for example, where there are files that are installed or registry entries that are changed, the record of which is not necessary to put into the installation database. The start or a similar command is thus used to initiate scanning and a stop or a similar command is used to terminate scanning.

If a "start" command is in the line, the NO SCAN flag is cleared in box 114 (if it is currently set). The NO SCAN flag places the processor in a nonparsing mode that is, the processor simply reads script and does nothing with it. The processor thereafter returns to box 104 to read the next line of script.

If a "start" command is not in the line, the processor proceeds to decision diamond 116, where it determines if the NO SCAN flag is currently set.

If the NO SCAN flag is set, the processor returns to box 104 to read the next line of script.

If the NO SCAN flag is not currently set, the processor proceeds to decision diamond 120 where it determines if the scan operation should be stopped or terminated. The scan operation is terminated when there is a comment line in the script containing a "stop" command. As noted, a "stop" command causes the processor to stop parsing until it encounters a "start" command.

If a "stop" command is in the line, the NO SCAN flag is set in box 124, and the processor returns to box 104 to read the next line of script. The processor continues to loop until it encounters a "start" command in a line of script.

Figure 2B:
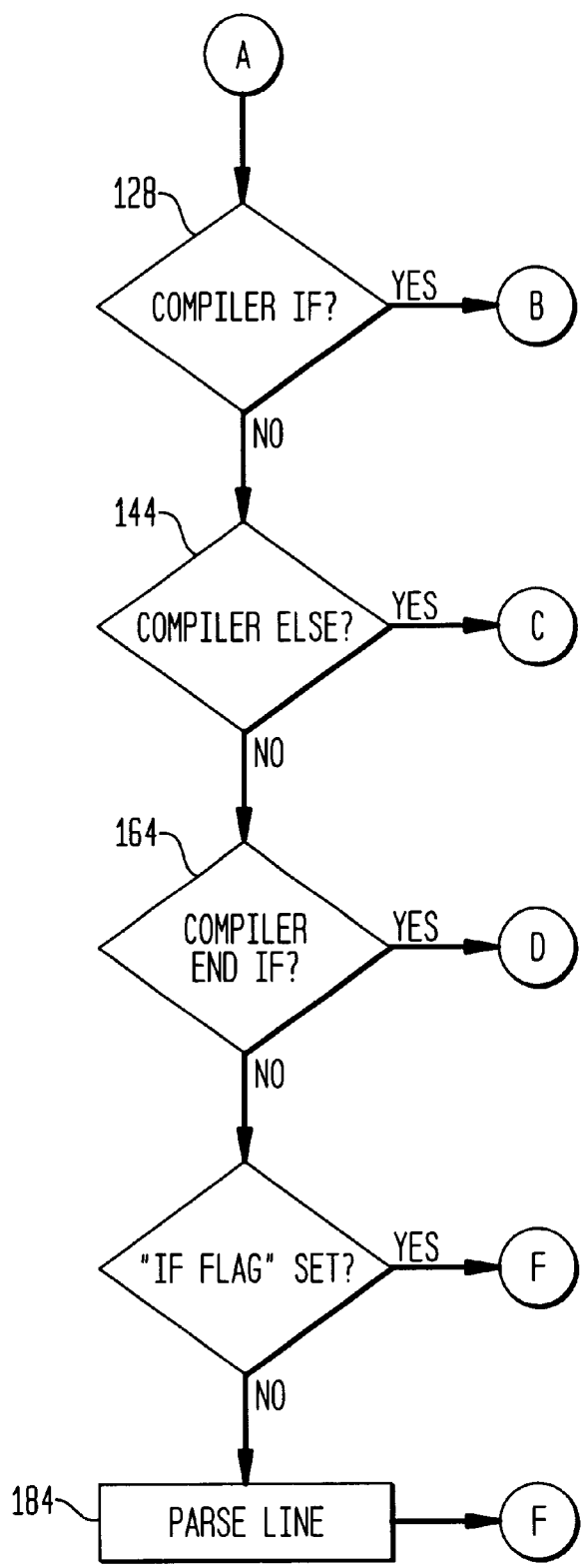

If a "stop" command is not in the line of script, the processor proceeds to decision diamond 128 in FIG. 2B and begins a series of queries to detect in the line of script the presence of a compiler variable, such as compiler variable "IF", "ELSE", and/or "END". As will be appreciated, these compiler variables permit the use of the same installation script for two similar but distinct installations of a given product. The architecture shown in FIGS. 2B–E recognizes these variables and is able to apply the same rules that the compiler program would use in interpreting the script.

Referring to FIG. 2B, in decision diamond 128 the processor checks the line of script for the compiler variable "IF"

Figure 2C:
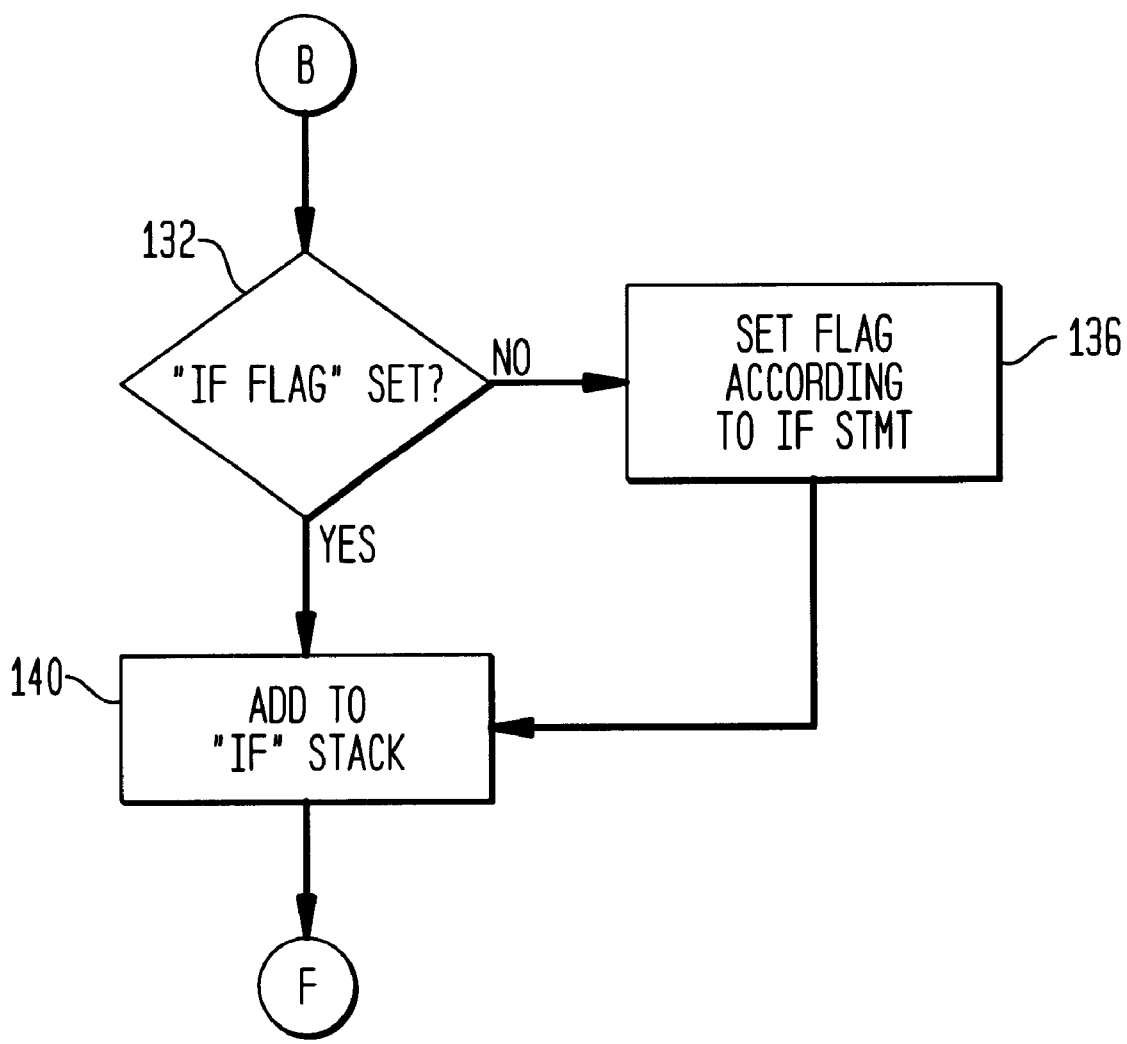

If the compiler variable is present, the processor proceeds to FIG. 2C. Referring to FIG. 2C, the processor determines in decision diamond 132 if the IF flag is currently set.

If the flag is not currently set, the processor in box 136 sets the flag according to the compiler variable "IF" statement. The IF flag causes the computer to be in a nonparsing mode and is set when a line of script includes a compiler variable "IF" and the compiler variable "IF" statement is untrue. If the compiler variable "IF" statement is true, the processor does not set the "IF" flag.

If the IF flag is already set or if the IF flag is set or cleared in box 136, the processor proceeds to box 140 where the processor adds the compiler variable IF statement to an "IF" stack. The "IF" stack is maintained to determine a nesting level associated with each compiler variable IF statement to permit the processor to identify to which compiler variable IF statement other compiler variables such as compiler variable "ELSE" and compiler variable "END" correspond. After adding the IF statement to the IF stack, the processor returns to box 104 to read the next line of script.

Referring again to FIG. 2B, in the event that the script does not contain a compiler variable "IF" the processor determines in decision box 144 whether the line of script includes a compiler variable "ELSE".

Figure 2D:
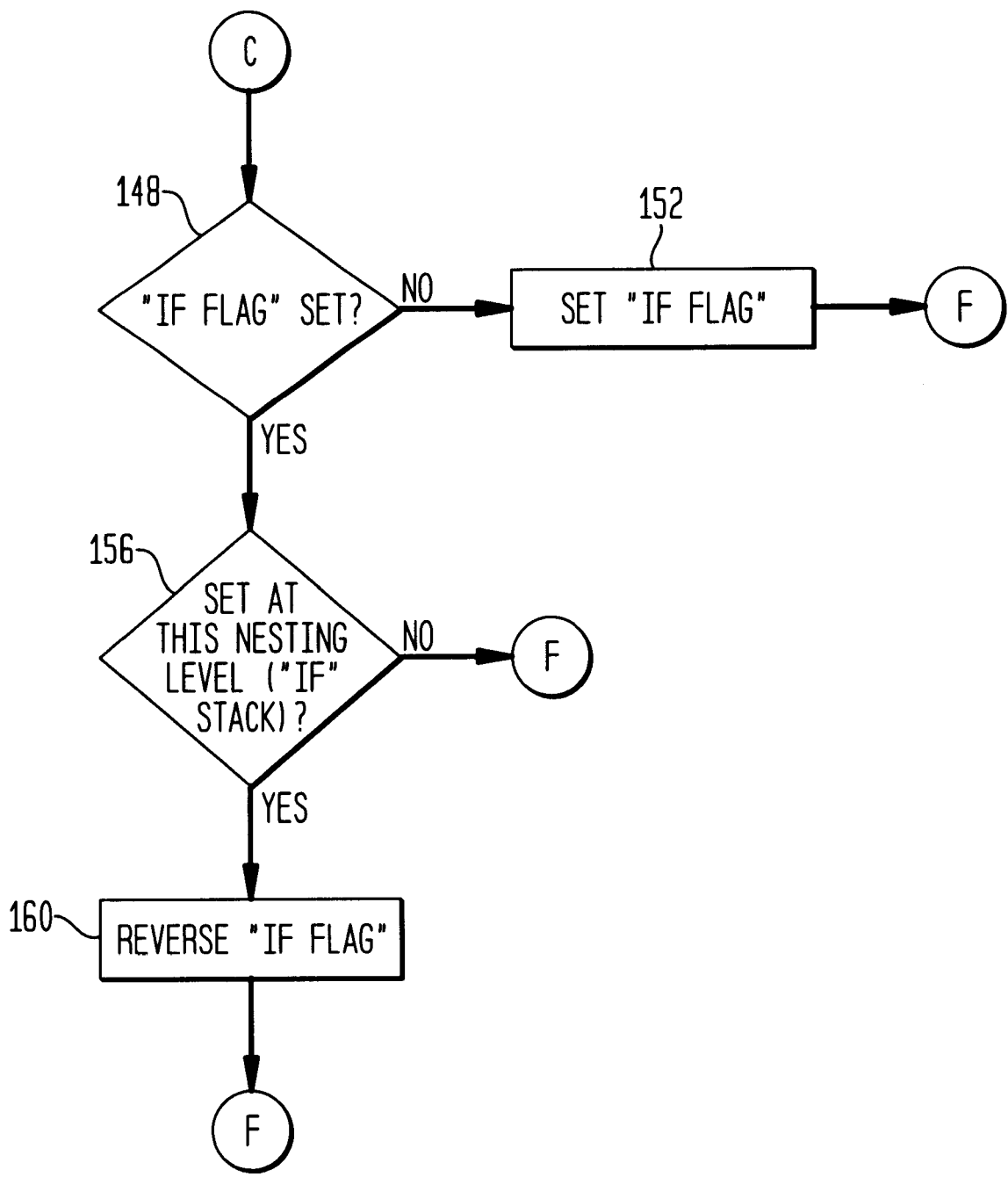

If the line includes a compiler variable "ELSE", the processor proceeds to decision diamond 148 in FIG. 2D. If the IF flag is not set, the IF flag is set in box 152 and the processor returns to box 104 to read the next line of script. If the "IF" flag is set (i.e., the compiler variable ELSE command is nested), the processor proceeds to decision diamond 156 and determines if the IF flag is set at the nesting level of the compiler variable ELSE. In other words, the processor determines if the nesting level of the compiler variable "ELSE" is the same as the nesting level of the compiler variable IF statement at the time that the IF flag was set. As will be appreciated, the compiler variable IF statement causing the IF flag to be set is marked with an appropriate indicator when the IF statement is placed into the IF stack to permit this determination to be made. When the IF flag is at a different nesting level, the processor returns to box 104. As will be appreciated, the stack records the nesting level of the compiler variable IF statements in the stack by correlating the nesting level to the position of the statement in the stack. By way of example, the first nesting level is the position of the first IF statement placed into the stack; the second nesting level is the position of the second IF statement placed into the stack; and so on. If the IF flag is at the same nesting level, the processor proceeds to box 160 where it reverses the IF flag state before returning to box 104 to read the next line of script. In other words, the IF flag is set in box 160 if it has been previously cleared, and cleared if it has been previously set.

Returning to FIG. 2B, the processor proceeds to decision diamond 164 in the event that the line of script does not include a compiler variable ELSE. In that diamond, the processor determines whether the line of script includes a compiler variable "END IF" statement. As will be appreciated, the compiler variable "END" represents the termination of an operation, such as a compiler variable IF statement "END IF"). In box diamond 164, the processor typically searches for an compiler variable "END IF" only.

Figure 2E:
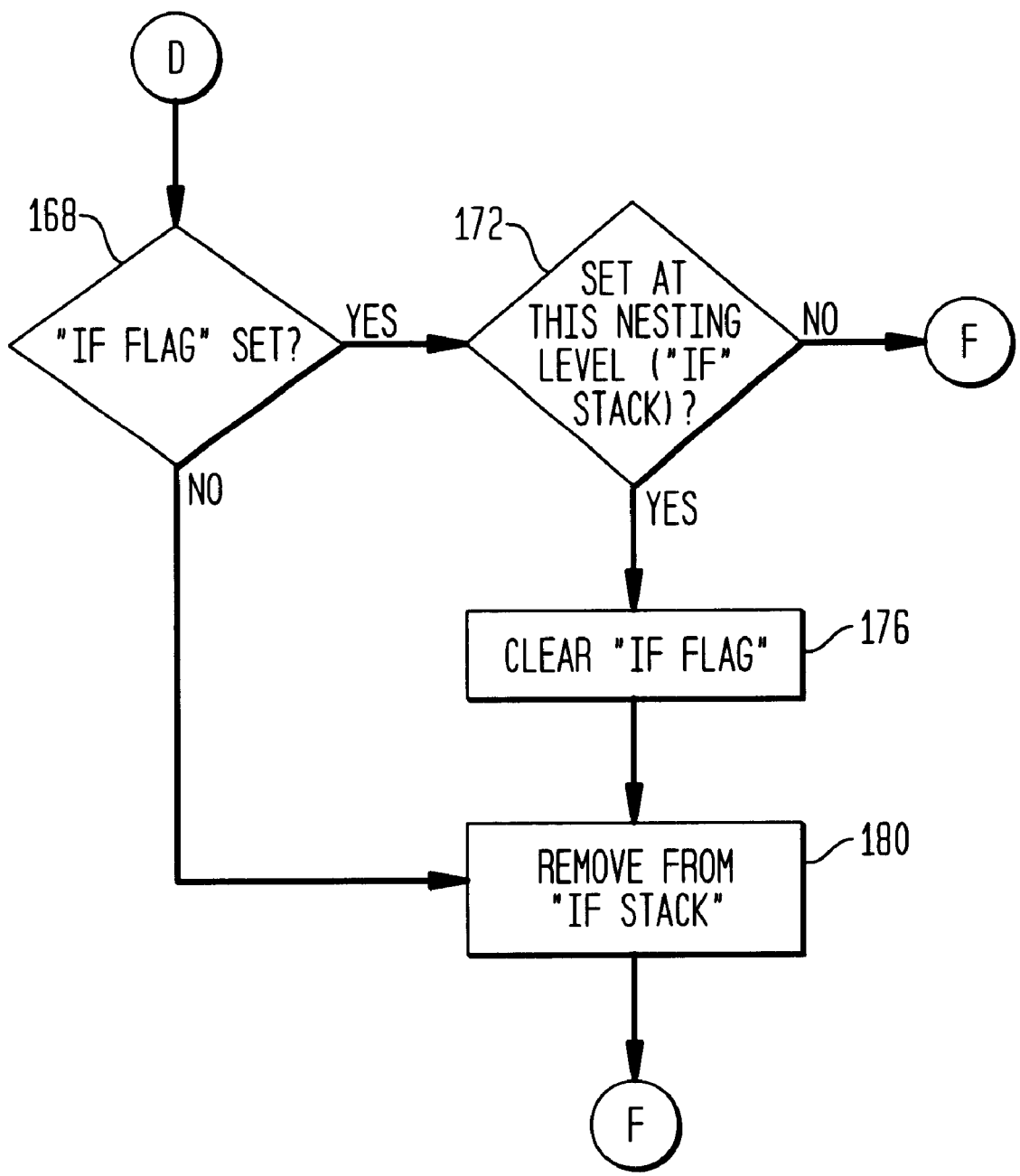

If the line of script includes a compiler variable "END", the processor proceeds to decision diamond 168 in FIG. 2E, where the processor determines whether the IF flag is set. If the IF flag is set, the processor proceeds to decision diamond 172. In that diamond, the processor determines if the IF flag was set in response to a compiler variable IF statement having the same nesting level as the compiler variable "END". If not, the processor proceeds to box 104 where it reads the next line of script. If so, the processor proceeds to box 176 where it clears the IF flag.

If the IF flag is not set or if the IF flag is cleared in box 176, the processor proceeds to box 180 where it removes the IF statement from the IF stack. In this step, the IF flag setting before the removed IF statement was read is restored. In other words, the IF flag setting in place before the IF statement (removed from the stack in box 180) was read and added to the IF stack in box 140 becomes the current IF flag setting.

Returning to FIG. 2B, when the IF flag is set (decision diamond 172) the processor proceeds to box 104 where it reads but does not parse the next line of script. When the IF flag is not set, the processor proceeds to box 184 where it parses the current line of script. After parsing the current line of script in box 184, the processor returns to box 104 to read the next line of script.

A simple example will demonstrate the preceding discussion of the compiler variables. For purposes of the example, assume the following compiler variable script:

IF A=1
  IF B=2
    HERE?
  ELSE
  END IF B
ELSE
  HERE 2
END IF A

In a first example, assume that A is equal to one and that the IF flag is not set. In that event, the IF flag is not set in box 136 (FIG. 2C). In a second example, assume that A is not equal to one. In that event, the IF flag is set in box 136 if the IF flag is not already set.

The processor next reads IF B=2. If B is equal to two, the processor does not set the IF flag in box 136 and if B is not equal to two the processor sets the IF flag in box 136.

The processor reads the HERE? statement and parses the line if the IF flag or NO SCAN flag is not set.

The processor next reads the compiler variable ELSE statement corresponding to the IF B=2 statement. Assuming that the IF flag is not set, the processor sets the flag in box 152. Assuming that the IF flag is set, the processor determines whether the nesting level of the compiler variable ELSE is the same as the nesting level of the compiler variable IF statement that caused the IF flag to be set. Assuming that the IF A=1 statement caused the IF flag to be set, the processor does not reverse the flag in box 160 but returns to box 104. Assuming that the IF B=2 statement caused the flag to be set, the processor clears or reverses the flag in box 160.

The processor then reads the compiler variable END IF B statement. Assuming that the IF flag is not set, the processor removes the compiler variable IF B=2 statement from the IF stack based on a last-in-first-out logic. Assuming that the IF flag is set, the processor determines whether the nesting level of the compiler variable END is the same as the nesting level of the compiler variable IF statement that caused the IF flag to be set. Assuming that the IF A=1 statement caused the IF flag to be set, the processor does not clear the flag but returns to box 104. Assuming that the IF B=2 statement caused the flag to be set, the processor clears the flag in box 176.

The NO SCAN flag does not have nesting levels (e.g., a stack) like the IF flag to reflect the nesting of the "stop" and "start" commands referred to above. This is so because the compiler variable "IF" can cause the nesting of these commands to be ignored. The "stop" and "start" scan comments override the compiler variable "IF", "ELSE" and "END" statements. This is so because the compiler variable IF statement may not be parsible or may be irrelevant or inappropriate to the verification process. A compiler variable "IF" can be used to exclude an entire section of a script, for instance one for a different product. It would not be appropriate for the software to be parsing and collecting data on the files and other information contained in a part of the script that will not appear in the install program.

After the processor has read all of the installation script in box 100, the processor in box 188 (FIG. 1) creates a list of program files, data files, and registry entry changes. As will be appreciated, this step could also be performed concurrently with the read operation of box 100. The fields in the list include those set forth above.

In box 192, the processor selects a next program file, data file, or registry entry change in the list, and in box 196 collects the file size, last modification date, file version (if present), and registration information for the selected program file, data file, or registry entry change. As will be appreciated, a version resource is included in certain "WINDOWS" files, which provides information about the file such as file description, file location, file version, and registration information (information about file types (e.g., DLL files) that is stored in the system registry and for which the "WINDOWS" operating system requires quick access). The processor also collects the location where the file will be installed on the target processor.

As will be appreciated, the processor can collect other information as desired. By way of example, the processor can collect information on the amount of free disk space, software configuration information (i.e., ".INI" files), and hardware component or configuration information.

In box 200, the processor places the information into the installation database or file. This database or file is distinct from program data or files. The actual form of the data in the database is unimportant.

In decision diamond 204, the processor determines if there is another program file, data file, or registry entry change in the list that has not been read. If so, the processor returns to box 192 to read the next item. If not, the installation database is completed and the process of creating the database is terminated.

In addition to the installation script, there are other modifiers or files that the builder or installer can create to add additional information to the installation database. A first type of file describes file entries. By way of example, if an application program being installed has a pre-requisite program that must be previously installed to allow the program to work, a check can be made for correct and complete installation of that pre-required software. This can be done by selecting one or more files that are installed as a result of that previous installation. This also applies for Registry information. A second type of file describes registry key information. As will be appreciated, the installation script typically adds registry entries or changes. These registry entries or changes are parsed out by the software of the present invention and added to the installation database. Any registry entry or changes that are not part of the installation database through the parsing operation are added by a file that describes the registry entry. A third type of file describes rules. Examples of rules include rules on how to group files for display, how to report a discrepancy between installed files and files in the installation program, and the like. This feature is discussed in more detail below with reference to FIG. 4. A fourth type of file lists the above files and the name of the installation script. By way of example, this type of file provides a convenient single listing of all the related files necessary to build a database for a specific application. When the software is executed, the processor acquires the names of the file(s) to process from this fourth type of file. It is referred to as a control or build file. These modifiers or files can be added to the installation program after the above-noted software is executed to obtain a desired output. In that event, the software could be re-executed to provide a new installation database that is modified relative to the old installation database.

Figure 4:
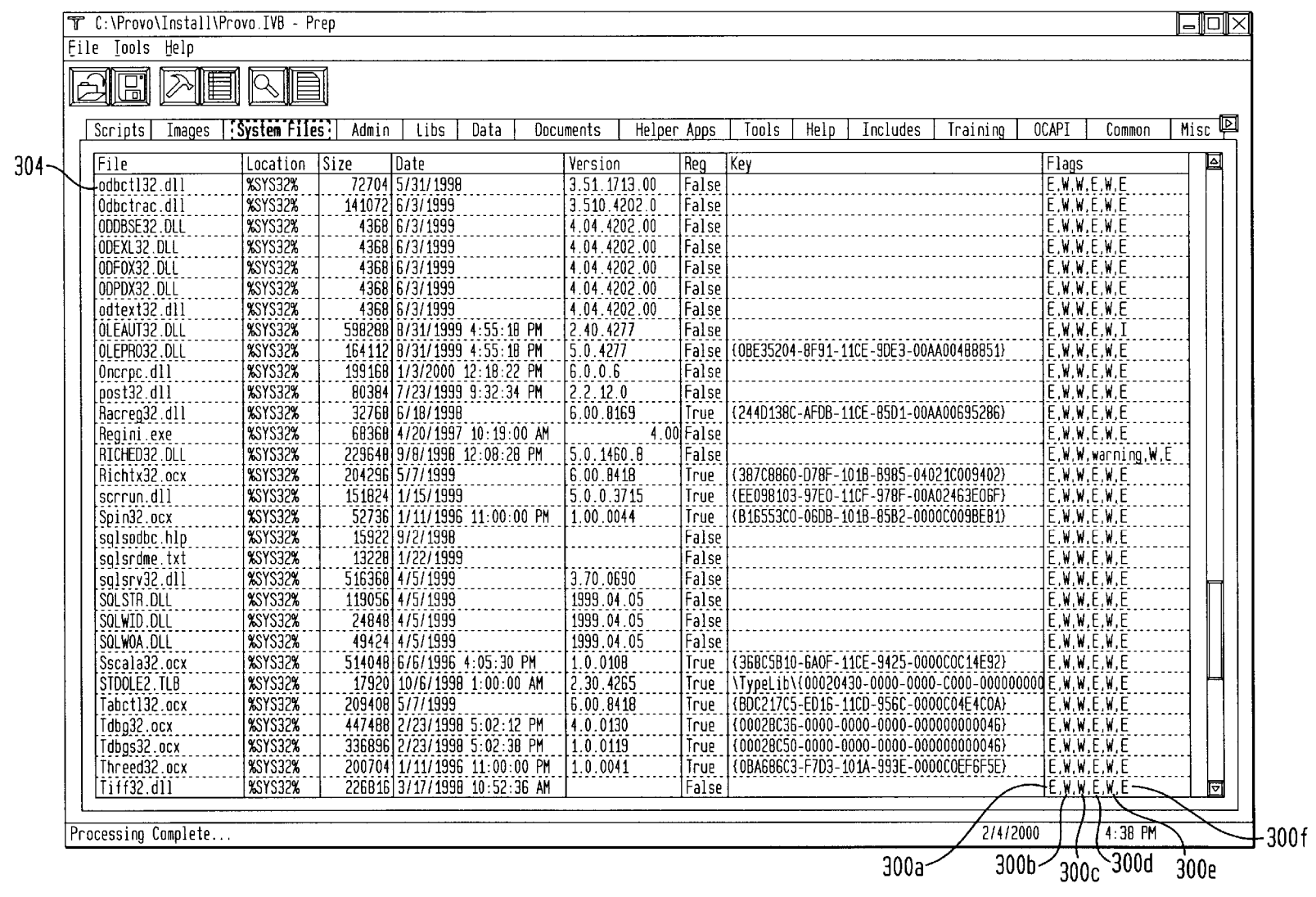

An example of the installation database contents is depicted in FIG. 4. The database lists filename ("FILE"), file location ("LOCATION"), file size ("SIZE"), last modification date of the file ("DATE"), file version ("VERSION"), registration status ("REG"), Registry information ("KEY"), and exception category ("FLAG"). Exceptions are sorted into multiple categories, namely error ("E"), warning ("W"), and ignore ("I"). The first location 300*a* corresponds to a discrepancy (between the installation database and the actual location on the target computer): the second position 300*b* to a discrepancy in file size; the third position 300*c* to a discrepancy in file modification date; the fourth position 300*d* to a discrepancy in file version (applies where the target computer has an older file version); the fifth position 300*e* to a discrepancy in file version (applies where the target computer has a newer file version); and finally the sixth position 300*f* to a discrepancy in registry information. By way of example, for file 304, a discrepancy in file location is treated as an error, in file size as a warning, in file modification date as a warning, in file version (older version on target computer) as an error, in file version (newer version on target computer) as a warning, and in Registry information as an error. The location, version, and Reg columns are shown in red to signify that a discrepancy for any file in these areas is an error and the size and date columns in yellow to signify that a discrepancy for any file in these areas is a warning.

For security, the installation database can be in a tamper resistant or tamper proof format. This prevents a user from easily editing the database to hide modifications that may be the cause of system failure. Such modifications can, for example, void warranty or support obligations on the part of the software supplier. In one configuration, the database is in a difficult-to-edit format, such as OLE structured storage which is a Microsoft standard data format. There are no generic editors for files in this format. In another configuration, the database is encrypted using any of the available encrypting algorithms, such as Hash, Parity, Transposition Cipher, and so forth.

The installation database or file could be incorporated with the install program or script to form the installation program. When the installation program is executed on a target processor, the database is copied onto the target processor.

Figure 3A:
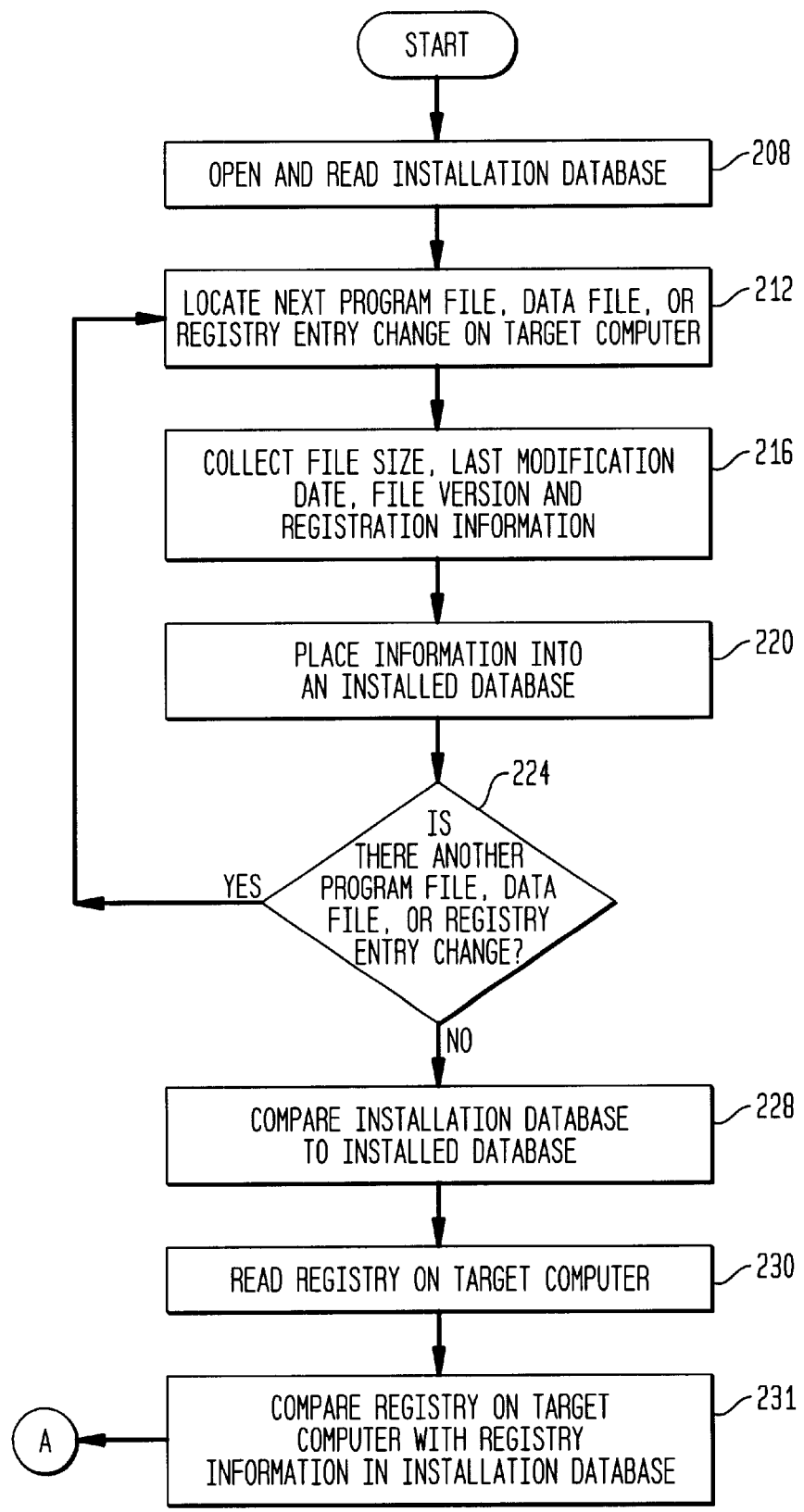
FIGS. 3A and B are flowcharts according to another embodiment of the present invention.

FIG. 3A depicts a software architecture or verification tool according to another embodiment of the present invention. The software is typically included in the installation program. In one configuration, the architecture interfaces with the installation database to verify installation of the product corresponding to the installation program. During installation, the software is copied onto the target computer along with the installation database.

When a user of the target computer wishes to verify the installation of the product, he or she executes the software verification tool of FIG. 3A. In box 208, the processor of the target computer opens and reads the installation database. The processor in box 212 locates on the target computer each of the program files, data files, and/or registry entry changes in the installation database. The processor then collects in box 216 the same information contained in the installation database concerning the program files, data files, and/or registry entry changes and places the information in box 220 into the installed database or file. In one configuration, this information includes file size, last modification date, file version (if present), and registration information. As will be appreciated, the installed "database" may not be written to disk but may be maintained only in the target computer's memory.

In decision diamond 224, the processor determines if there is another program file, data file, or registry entry change in the installation database. If so, the processor returns to box 212 to repeat the above steps with respect to that item. If not, the processor proceeds to box 228 where the computer compares the installation database to the installed database or file to identify differences or discrepancies. The computer then proceeds to box 230 where the computer reads registry information on the target computer and, in box 321, compares this information with registry information in the installation database to identify other differences and discrepancies. Such differences or discrepancies may be a problem in the execution of the product.

Figure 3B:
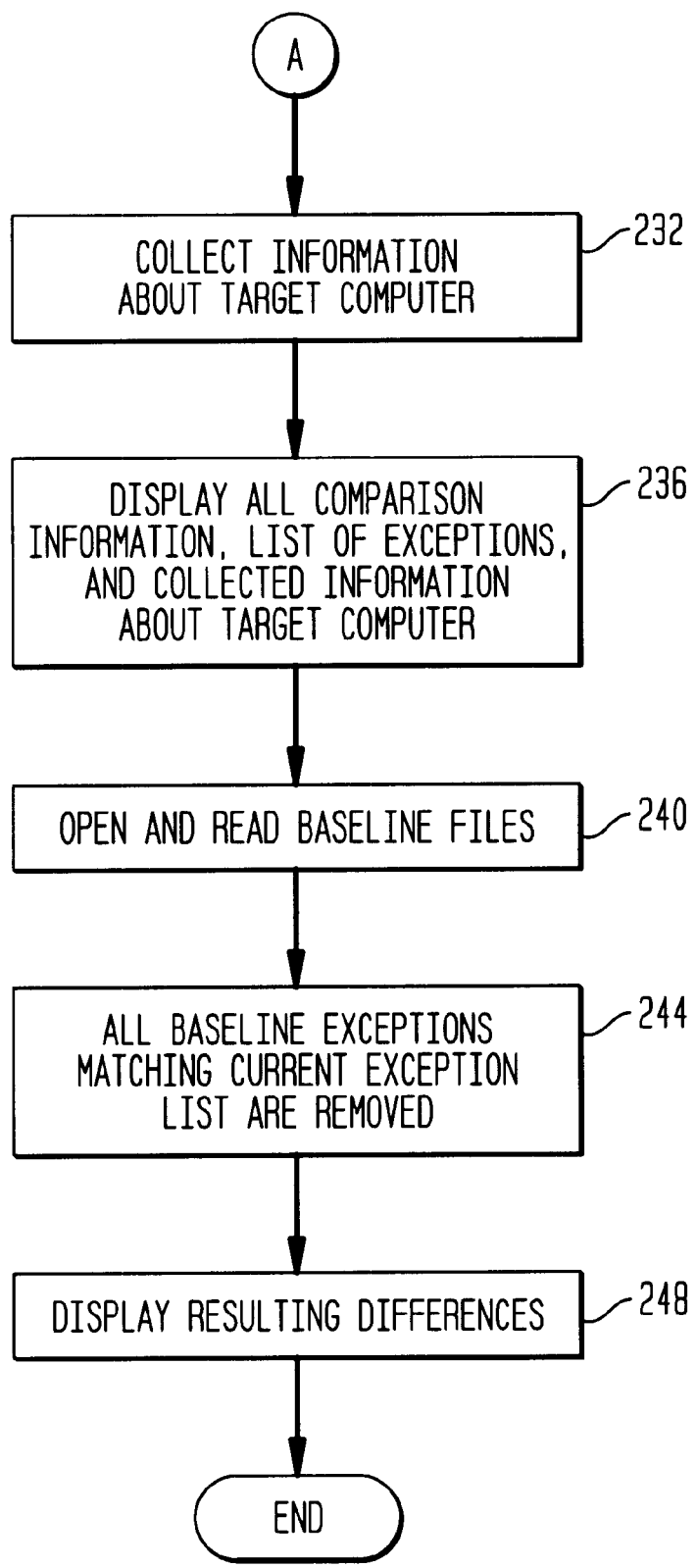

In box 232 (FIG. 3B), the processor collects target computer information. This information includes a summary of the installation process (i.e., installation log which is a directory of all files that were replaced and/or all files added during the installation), hardware configuration information, operating system configuration, current date/time, and the like. In one configuration, the installation database includes the contents of specific files, the contents of specific directories (i.e., lists of file names), and the contents of specific Registry keys and values. This information is in addition to the information gathered in FIG. 1. Such information provides a vehicle to report specific information from the target computer back to a support organization. In another configuration, the target computer can read its saved/e-mailed data and display it in the same graphical manner as the other data described herein. This allows for viewing of previous data or data from another location.

In box 236, all of the information obtained in the comparing steps 228 and 231, including exceptions and collected information about the target computer, is graphically displayed in any desirable format. An "exception" is typically a difference between corresponding fields in the installation and installed databases or files. Examples of exceptions include "file is missing," "file is different size," "file is different date," "file version is older," "file version is newer," "file is not registered," "file registered is not in the correct installation location,"registry key is missing," "registry value name is missing," and "registry value data is incorrect." In one configuration shown in FIG. 5, the information is displayed in a tabbed grid "WINDOWS" compatible format. The content of each tab is described in an input file included in the installation database.

Figure 5:
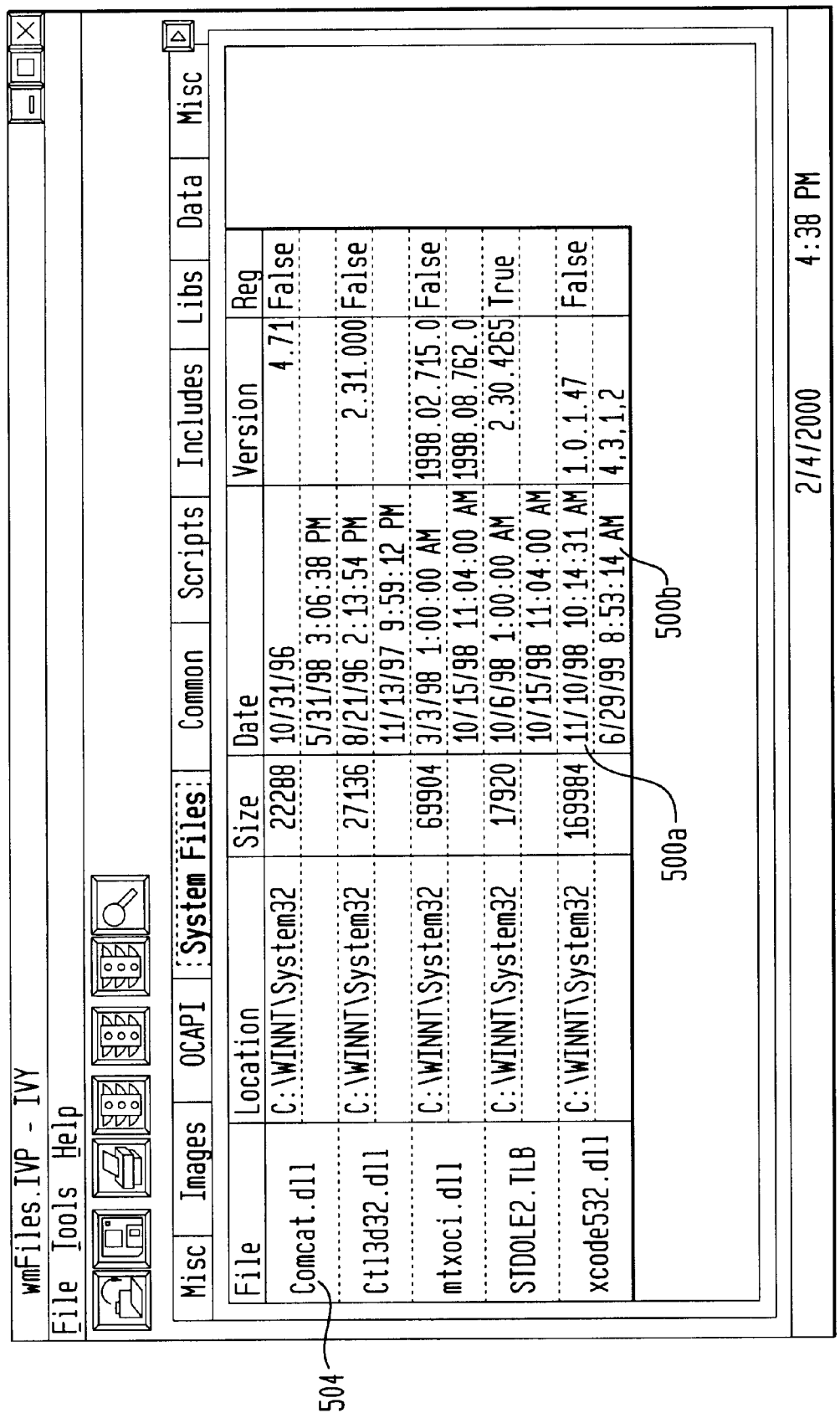
FIG. 5 is a sample of the graphical display of the exceptions identified during the comparing step.

Referring to FIG. 5, the display provides, for each exception, the file name("FILE"), the file location ("LOCATION"), the file size("SIZE"), the last modification date ("DATE"), the file version("VERSION"), and the registration status ("REG"). Where an upper and lower entry are in the same column for a given file, it means that an exception exists in that area. Where a column has no lower entry for a given file, there is no exception for the file in that area. For example, entry 500a refers to the modification date for the file in the installation database and entry 500b refers to a different modification date for the file on the target computer. For the file 504 there is no discrepancy for file location, file size, file version and registration status. The lower entries (e.g., 500b) for each file are colored to show the severity of the exception (e.g., yellow or red).

As illustrated by FIG. 5, exceptions can be displayed selectively at differing levels depending, for example, on the field to which the exception pertains. In one configuration, general information about the severity of the exceptions is provided and is modified on a per category (tab) basis or specifically for an individual item. There are additional criteria for modifying the reporting of exceptions on groups of files. More serious types or categories of exceptions are displayed as "errors" and less serious types or categories of exceptions as "warnings". Differing icons and/or colors can be used in the graphical display to highlight these differing levels of exceptions.

The user may choose to display all information, serious exceptions only, or all exceptions only. The information that can be displayed at any one time can be tailored to meet the unique requirements of each application.

The installed database or file can be printed and/or saved in a format suitable for e-mail transmission (as an attachment). As will be appreciated, desired sections only of the installed database or file can be printed and/or saved as a report. In one configuration, the file is saved in plain ASCII (easily editable) text file for ease of transmission and use by others. This permits a user to import the file into a desired viewer such as "EXCEL". In Web-based applications, the installed database or file can be incorporated into one or more web pages. In another configuration, the appearance of one or more predetermined types of exceptions can write to system exception log, or activate an electronic paging feature to summons service or maintenance personnel. The software of FIGS. 3A and 3B can be executed periodically to identify exceptions, log the exceptions into a log file, parse the log file, and/or activate the paging feature.

Boxes 240 through 248 depict a process known as "base lining." In this process, a baseline file, which is simply a "snapshot" of the exceptions on the target computer at a given time, is generated manually or automatically. The baseline file can be used to "mask" or remove previous exceptions from the installed file or database. This provides a convenient method of screening for "new" exceptions. This is particularly useful because in a typical installation, there may be newer support files already present on the target computer. This is not actually an error, just an exception to the install requirements. Using the base lining process, these exceptions can be excluded from further displays of exception data. This feature permits a user to track which files have changed and how they have changed in a manner that permits subsequent (or cascading) changes to be identified. This allows the verification tool to be used automatically and/or periodically for system monitoring.

Referring again to FIG. 3B, after the user has selected the baselining option (by for example pressing an icon on a tool bar or selecting a menu item) the processor in box 240 opens and reads the baseline file(s). In box 244, the processor iteratively compares the contents of the baseline file(s) with the list of exceptions and other pertinent information in the installed database of file(s). Any matching items are removed from the list of exceptions to be displayed graphically to the user. In box 248, the edited list of exceptions is displayed graphically for the user.

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for generating information for use in verifying an installation of at least one program onto a target computational component, comprising:

providing an installation program, the installation program comprising a set of installation instructions executable by a target computational component and at least one program to be installed on the target computational component, the installation instructions describing installation of the at least one program on the target computational component;

parsing at least some of the installation program to provide a collection of a plurality of first file identifiers and/or first file changes associated with the installation program; and collecting additional information associated with each of the plurality of first file identifiers and/or first file changes in the collection to form installation data, wherein the parsing step includes setting a mode indicator for controlling a mode of a build computational component, the mode being at least one of a parsing mode and a nonparsing mode.

2. The method of claim 1, further comprising:

executing the installation program on the target computational component;

collecting a plurality of corresponding second file identifiers and/or second file changes on the target computational component; and comparing the installation data with the plurality of corresponding second file identifiers and/or second file changes to identify exceptions between corresponding first and second file identifiers and/or first and second file changes.

3. The method of claim 2, wherein the comparing step generates one or more exceptions and the further comprising:

filtering the one or more exceptions by comparing the one or more exceptions to a previously determined set of exceptions.

4. The method of claim 1, wherein the additional information includes one or more of the following: file description, file location, file size, file version, last modification date of file, and whether or not the file is registered.

5. The method of claim 2, wherein the comparing step includes:

collecting information on a file installed on the target computational component during the executing step, the information including file location, file size, file version, last modification date of file, and whether or not the file is registered.

6. The method of claim 1, wherein the parsing step includes:

searching in the text of the installation program for a symbol indicating a change in mode of the build computational component.

7. The method of claim 6, wherein the symbol is a compiler variable.

8. The method of claim 1, wherein the parsing step includes:

searching the text of the installation program for a compiler variable; and setting a mode indicator based on the value of the compiler variable.

9. The method of claim 1, wherein the parsing step includes:

determining a nesting level associated with a compiler variable; and setting the mode indicator based on the nesting level.

10. The method of claim 9, wherein the parsing step includes:

removing the compiler variable from a stack of compiler variables, the stack providing the nesting level of the compiler variable.

11. The method of claim 2, wherein the comparing step includes:

collecting predetermined information about the target computational component, the predetermined information including a directory of files that were replaced during installation, a directory of files added during the installation, hardware configuration information, operating system configuration, and date/time.

12. The method of claim 1 wherein the parsing and collecting steps are performed simultaneously.

13. The system of claim 1 further comprising:

means for executing the installation program on the target computational component;

means for collecting second file identifiers and/or second file changes on the target computational component; and means for comparing the computational component installation data with the second file identifiers and/or second file changes to identify exceptions.

14. The system of claim 13, wherein the means for comparing generates one or more exceptions and further comprising:

means for filtering the one or more exceptions by comparing the one or more exceptions to a previously determined set of exceptions.

15. The system of claim 1, wherein the additional information includes one or more of the following: file location, file size, file version, last modification date of file, and whether or not the file is registered.

16. A system for generating information for use in verifying an installation of at least one program onto a target computational component, comprising:

memory means comprising an installation program, the installation program comprising a set of installation instructions executable by a target computational component and at least one program to be installed on the target computational component, the installation instructions describing installation of the at least one program on the target computational component;

means for parsing at least some of the installation program to provide a collection of file identifiers and/or file changes associated with the installation program; and means for collecting additional information about each of the files corresponding to the file identifiers and/or about each of the file changes in the collection to form installation data, wherein said means for parsing includes means for setting a mode indicator for controlling a mode of the a build computational component, the mode being at least one of a parsing mode and a nonparsing mode.

17. The system of claim 16, wherein the means for parsing includes:

means for searching in the text of the installation program for a symbol indicating a change in mode of the build computational component, wherein the symbol is at least one of a compiler variable and a noncompiler variable.

18. The system of claim 16, wherein the means for parsing includes:

means for determining a nesting level associated with a compiler variable; and means for setting the mode indicator based on the nesting level.

19. The system of claim 13, wherein the means for comparing includes:

means for collecting predetermined information on a file installed on the target computer, the information including file location, file size, file version, last modification date of file, and whether or not the file is registered.

20. The system of claim 16, wherein the installation file contains a collection of file identifiers and file changes associated with the installation program and, for each file identifier, one or more of the following: corresponding file location, corresponding file size, corresponding file version, last modification date of corresponding file, and whether or not the corresponding file is registered.

21. A system for generating information for use in verifying an installation of at least one program, comprising:

a first computational component;

an installation program in the first computational component, the installation program comprising a set of installation instructions executable by a second computational component and at least one program to be installed on the second computational component, the installation instructions describing installation of the at least one program on the second computational component;

a parser for parsing at least some of the installation program to create an installation file, the installation file containing first information associated with the target computational component after execution of the installation program by the target computational component; and a mode indicator for controlling a mode of the first computational component, the mode being at least one of a parsing mode and a nonparsing mode.

22. The system of claim 21, further comprising:

an information collector for collecting, after execution of the installation program by the second computational component, second information corresponding to the file identifiers and/or file changes in the installation file, the second information comprising second file changes, second file identifiers, and for each of the files corresponding to the second file identifiers: file location, file size, file version, last modification date of file, and whether or not the file is registered.

23. The system of claim 22, further comprising:

an installation verification tool for comparing the installation file with the second information to identify exceptions.

24. The system of claim 23, wherein the verification tool generates one or more exceptions and further comprising:

a filter for filtering the one or more exceptions by comparing the one or more exceptions to a previously determined set of exceptions.

25. The method of claim 22, wherein the installation and installed information further comprise one or more file identifiers and, for each file corresponding to each file identifier, one or more of the following: file description, file location, file size, file version, last modification date of file, and whether or not the file is registered.

26. The system of claim 21, wherein the parser includes:

a searcher for searching in the text of the installation program for a symbol indicating a change in mode of the first computational component, the symbol being at least one of a compiler variable and a noncompiler variable.

27. The system of claim 21, wherein the parser includes:

a nesting level associated with a compiler variable;

a stack of items for tracking the nesting level; and a mode setter for setting the mode indicator based on the nesting level.

28. A system for generating information for use in verifying an installation of at least one program, comprising:

a first computational component;

an installation program in the first computational component, the installation program comprising a set of installation instructions executable by a second computational component and at least one program to be installed on the second computational component, the installation instructions describing installation of the at least one program on the second computational component;

a parser for parsing at last some of the installation program to create an installation file, the installation file containing first information associated with the target computational component after execution of the installation program by the target computational component, wherein the parser includes a searcher for searching in the text of the installation program for a symbol indicating a change in mode of the first computational component, the symbol being at least one of a compiler variable and a noncompiler variable.

29. The system of claim 28, wherein the installation file contains a collection of file identifiers and file changes associated with the installation program and, for each file identifier, one or more of the following: corresponding file location, corresponding file size, corresponding file version, last modification date of corresponding file, and whether or not the corresponding file is registered.

30. The system of claim 28, wherein the parser includes:

a nesting level associated with a compiler variable;

a stack of items for tracking the nesting level; and a mode setter for setting the mode indicator based on the nesting level.

31. The system of claim 28, further comprising:

an information collector for collecting, after execution of the installation program by the second computational component, second information corresponding to the file identifiers and/or file changes in the installation file, the second information comprising second file changes, second file identifiers, and for catch of the files corresponding to the second file identifiers: file location, file size, file version, last modification date of file, and whether or not the file is registered.

32. The system of claim 31, further comprising:

an installation verification tool for comparing the installation file with the second information to identify exceptions.

33. The system of claim 32, wherein the verification tool generates one or more exceptions and further comprising:

a filter for filtering the one or more exceptions by comparing the one or more exceptions to a previously determined set of exceptions.

34. A system for generating information for use in verifying an installation of at least one program, comprising:

a first computational component;

an installation program in the first computational component, the installation program comprising a set of installation instructions executable by a second computational component and at least one program to be installed on the second computational component, the installation instructions describing installation of the at least one program on the second computational component;

a parser for parsing at least some of the installation program to create an installation file, the installation file containing first information associated with the target computational component after execution of the installation program by the target computational component, wherein the parser includes:

a nesting level associated with a compiler variable, a stack of items for tracking the nesting level; and a mode setter for setting the mode indicator based on the nesting level.

35. The system of claim 34, wherein the installation file contains a collection of file identifiers and file changes associated with the installation program and, for each file identifier, one or more of the following: corresponding file location, corresponding file size, corresponding file version, last modification date of corresponding file, and whether or not the corresponding file is registered.

36. The system of claim 34, further comprising:

an information collector for collecting, after execution of the installation program by the second computational component, second information corresponding to the file identifiers and/or fire changes in the installation file, the second information comprising second file changes, second file identifiers, and for each of the files corresponding to the second file identifiers: file location, file size, file version, last modification date of file, and whether or not the file is registered.

37. The system of claim 36, further comprising:

an installation verification tool for comparing the installation file with the second information to identify exceptions.

38. The system of claim 37, wherein the verification tool generates one or more exceptions and further comprising:

a filter for filtering the one or more exceptions by comparing the one or more exceptions to a previously determined set of exceptions.

39. A method for verifying an installation of at least one program onto a target computational component, comprising:

providing an installation program, the installation program comprising a set of installation instructions executable by a target computational component and at least one program to be installed on the target computational component, the installation instructions describing installation of the at least one program on the target computational component;

parsing at least some of the installation program to generate hypothetical installation information associated with the execution of the installation program;

executing the installation program;

collecting actual installed information associated with the execution of the installation program; and comparing the hypothetical installation information with the actual installed information to identify one or more exceptions, wherein the hypothetical installation information and actual installed information each comprise at least one of file identifiers and file changes, and wherein the parsing step includes:

when a mode indicator is identified, setting a mode indicator for controlling a mode of a build computational component, the mode being at least one of a parsing mode and a nonparsing mode.

40. The method of claim 39, wherein the parsing step includes:

searching in the text of the installation program for a symbol indicating a change in mode of the build computational component.

41. A method for verifying an installation of at least one program onto a target computational component, comprising:

providing an installation program, the installation program comprising a set of installation instructions executable by a target computational component and at least one program to be installed on the target computational component, the installation instructions describing installation of the at least one program on the target computational component;

parsing at least some of the installation program to generate hypothetical installation information associated with the execution of the installation program;

executing the installation program;

collecting actual installed information associated with the execution of the installation program; and comparing the hypothetical installation information with the actual installed information to identify one or more exceptions, wherein the hypothetical installation information and actual installed information each comprise at least one of file identifiers and file changes, and wherein the parsing step includes:

searching in the text of the installation program for a symbol indicating a change in mode of the build computational component.

42. The method of claim 41, wherein the symbol is a compiler variable.

43. The method of claim 42, wherein the parsing step includes:

determining a nesting level associated with the compiler variable; and setting a mode indicator based on the nesting level.

44. The method of claim 43, wherein the parsing step includes:

removing the compiler variable from a stack of compiler variables, the stack providing the nesting level of the compiler variable.

45. The method of claim 41, wherein the comparing step generates one or more exceptions and the further comprising:

filtering the one or more exceptions by comparing the one or more exceptions to a previously determined set of exceptions.

46. The method of claim 41, wherein the installation and installed information further comprise one or more file identifiers and, for each file corresponding to each file identifier, one or more of the following: file description, file location, file size, file version, last modification date of file, and whether or not the file is registered.

47. The method of claim 41, wherein the comparing step generates one or more exceptions and the further comprising:

filtering the one or more exceptions by comparing the one or more exceptions to a previously determined set of exceptions.

* * * * *